United States Patent
Chen et al.

(10) Patent No.: US 10,878,980 B2
(45) Date of Patent: Dec. 29, 2020

(54) PPTC MATERIAL WITH LOW PERCOLATION THRESHOLD FOR CONDUCTIVE FILLER

(71) Applicant: Littelfuse, Inc., Chicago, IL (US)

(72) Inventors: Jianhua Chen, Sunnyvale, CA (US); Chun Kwan Tsang, Morgan Hill, CA (US)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 16/128,135

(22) Filed: Sep. 11, 2018

(65) Prior Publication Data
US 2019/0080824 A1    Mar. 14, 2019

Related U.S. Application Data

(60) Provisional application No. 62/557,336, filed on Sep. 12, 2017.

(51) Int. Cl.
| | | |
|---|---|---|
| H01C 7/02 | (2006.01) |
| H01B 1/02 | (2006.01) |
| H01C 1/14 | (2006.01) |
| C08L 23/08 | (2006.01) |
| C08L 23/06 | (2006.01) |
| C08K 3/013 | (2018.01) |
| C08K 3/14 | (2006.01) |

(Continued)

(52) U.S. Cl.
CPC ............ *H01C 7/027* (2013.01); *C08K 3/013* (2018.01); *C08K 3/14* (2013.01); *C08K 3/38* (2013.01); *C08L 23/06* (2013.01); *C08L 23/0853* (2013.01); *C08L 27/16* (2013.01); *H01B 1/026* (2013.01); *H01B 1/04* (2013.01); *H01C 1/14* (2013.01); *H01C 1/1406* (2013.01); *H01C 1/148* (2013.01); *H01C 17/06586* (2013.01); *C08K 2201/001* (2013.01); *C08K 2201/005* (2013.01); *H01C 17/0652* (2013.01); *H01C 17/06566* (2013.01)

(58) Field of Classification Search
CPC .. H01C 7/027; H01C 7/06586; H01C 7/0652; H01C 17/06586; H01C 17/0652; H01C 1/1406; H01B 1/026; H01B 1/02; H01B 1/04
USPC ............................ 252/500, 511, 516, 519.33
See application file for complete search history.

(56) References Cited

U.S. PATENT DOCUMENTS

| | | | | |
|---|---|---|---|---|
| 5,451,919 A | * | 9/1995 | Chu ........................ | H05B 3/146 338/22 R |
| 2002/0084883 A1 | * | 7/2002 | Glatz-Reichenbach | ..................... H01C 7/027 338/20 |

(Continued)

FOREIGN PATENT DOCUMENTS

| | | |
|---|---|---|
| CN | 2470923 Y | 1/2002 |
| CN | 104867636 A | 8/2015 |

(Continued)

*Primary Examiner* — Tri V Nguyen
(74) *Attorney, Agent, or Firm* — Kacvinsky Daisak Bluni PLLC

(57) ABSTRACT

A polymeric positive temperature coefficient (PPTC) device including a PPTC body, a first electrode disposed on a first side of the PPTC body, and a second electrode disposed on a second side of the PPTC body, wherein the PPTC body is formed of a PPTC material that includes a polymer matrix and a conductive filler, wherein the conductive filler defines 20%-39% by volume of the PPTC material.

8 Claims, 5 Drawing Sheets

(51) Int. Cl.
*C08K 3/38* (2006.01)
*C08L 27/16* (2006.01)
*H01C 1/148* (2006.01)
*H01C 17/065* (2006.01)
*H01B 1/04* (2006.01)

(56) References Cited

U.S. PATENT DOCUMENTS

| | | | | |
|---|---|---|---|---|
| 2008/0074232 A1* | 3/2008 | Chen | ............ | H01C 7/027 |
| | | | | 338/22 R |
| 2013/0070380 A1* | 3/2013 | Wang | ............ | H01C 7/027 |
| | | | | 361/93.8 |
| 2013/0094116 A1* | 4/2013 | Yang | ............ | H01B 1/20 |
| | | | | 361/93.7 |
| 2018/0186964 A1* | 7/2018 | Fu | ............ | H01C 7/028 |

FOREIGN PATENT DOCUMENTS

| | | | | |
|---|---|---|---|---|
| CN | 105139984 A | | 12/2015 | |
| EP | 0038717 B | * | 4/1981 | ............ H01C 7/02 |
| TW | 200816252 A | | 4/2008 | |
| TW | 200834612 A | | 8/2008 | |

\* cited by examiner

PPTC MATERIAL WITH LOW PERCOLATION THRESHOLD FOR CONDUCTIVE FILLER

CROSS-REFERENCES TO RELATED APPLICATIONS

This application claims the benefit of U.S. Provisional Patent Application No. 62/557,336, filed Sep. 12, 2017, the entirety of which is incorporated by reference herein.

FIELD OF THE DISCLOSURE

Embodiments relate to the field of circuit protection devices, including fuse devices.

BACKGROUND OF THE DISCLOSURE

Polymer positive temperature coefficient (PPTC) devices may be used as overcurrent or over-temperature protection devices, as well as current or temperature sensors, among various applications. In overcurrent or over-temperature protection applications, a PPTC device act as a resettable fuse, designed to exhibit low resistance when operating under predetermined conditions, such as low current. The resistance of the PPTC device may be altered by direct heating due to temperature increases in the environment of the PPTC device, or via resistive heating generated by electrical current passing through the PPTC device. For example, a PPTC device may include a composite PPTC material formed of a polymer material and a conductive filler, wherein the PPTC material transitions from a low resistance state to a high resistance state due to thermally-induced changes in the polymer material, such as a melting transition or a glass transition. At a transition temperature, sometimes called a "trip temperature," where the trip temperature may range from room temperature to well above room temperature, the polymer material may expand and disrupt the electrically conductive network of conductive filler particles in the PPTC material, rendering the PPTC material much less electrically conductive. This change in resistance imparts a fuse-like character to PPTC materials, which resistance may be reversible when the PPTC material cools back to room temperature.

The cost and weight of a PPTC material are generally dictated by the amount (e.g., percent by volume) of conductive filler in the PPTC material. In almost all applications, it is desirable to minimize the cost and weight of PPTC devices while maintaining desired operational characteristics such as trip temperature. It is with respect to these and other considerations that the present disclosure is provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

A PPTC device in accordance with an exemplary embodiment of the present disclosure may include a PPTC body, a first electrode disposed on a first side of the PPTC body, and a second electrode disposed on a second side of the PPTC body, wherein the PPTC body is formed of a PPTC material that includes a polymer matrix and a conductive filler, wherein the conductive filler defines 20%-39% by volume of the PPTC material.

Another PPTC device in accordance with an exemplary embodiment of the present disclosure may include a PPTC body, first and second metallic foil layers disposed on opposing sides of the PPTC body, respectively, and extending from first and second metallic traces at opposing ends of the PPTC body, respectively, wherein the first metallic foil layer extends toward, but does not contact, the second metallic trace, and wherein the second metallic foil layer extends toward, but does not contact, the first metallic trace. The PPTC device may further include electrically insulating insulation layers covering the first and second metallic foil layers, and metallic electrodes disposed on the insulation layers in electrical contact with the metallic traces. The PPTC body may be formed of a PPTC material that includes a polymer matrix and a conductive filler, wherein the conductive filler defines 20%-39% by volume of the PPTC material.

A PPTC material in accordance with an exemplary embodiment of the present disclosure may include a polymer matrix and a conductive filler, wherein the conductive filler defines 20%-39% by volume of the PPTC material and is formed of particles having a median diameter of 50 nanometers to 20 micrometers.

DETAILED DESCRIPTION

Figure 1A:
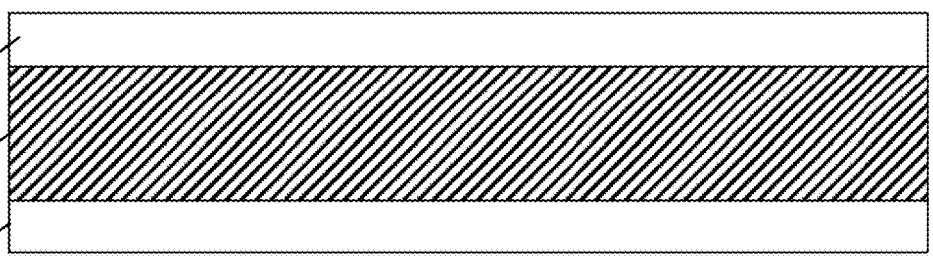
FIG. 1A and FIG. 1B illustrate a PPTC device according to embodiments of the present disclosure.

The present embodiments will now be described more fully hereinafter with reference to the accompanying drawings, in which exemplary embodiments are shown. The embodiments are not to be construed as limited to the embodiments set forth herein. Rather, these embodiments are provided certain exemplary aspects of the present disclosure to those skilled in the art. In the drawings, like numbers refer to like elements throughout.

In the following description and/or claims, the terms "on," "overlying," "disposed on," and "over" may be used in the following description and claims. "On," "overlying," "disposed on," and "over" may be used to indicate that two or more elements are in direct physical contact with one another. Also, the terms "on," "overlying," "disposed on," and "over", may mean that two or more elements are not in direct contact with one another. For example, "over" may mean that one element is above another element while not contacting one another and may have another element or elements in between the two elements. Furthermore, the term "and/or" may mean "and," it may mean "or," it may mean "exclusive-or," it may mean "one," it may mean "some, but not all," it may mean "neither," and/or it may mean "both," although the scope of the claimed subject matter is not limited in this respect.

In various embodiments, novel device structures and materials are provided for forming a PPTC device, where the PPTC device includes a PPTC material having a relatively low "percolation threshold," where "percolation threshold" is defined as a minimum percentage by volume of conductive ceramic filler in the PPTC material that is necessary for achieving a desired resistivity. In one example, a PPTC material in accordance with the present disclosure may exhibit a resistivity of about 0.15 ohm-cm with a percolation threshold in a range of 20%-39%.

Figure 1B:
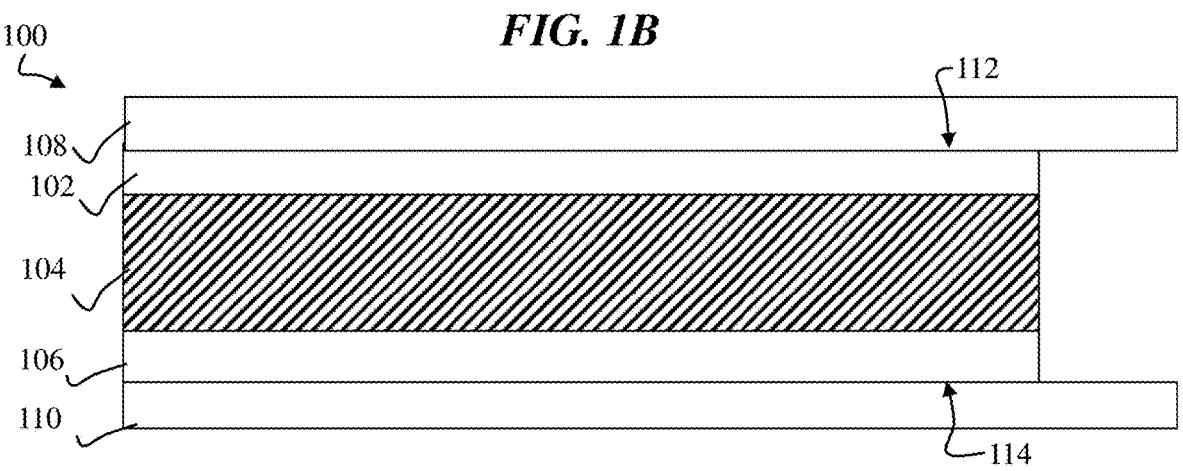

In various embodiments, a PPTC device may be constructed as shown in FIG. 1A and FIG. 1B. FIG. 1A illustrates a side cross-sectional view of a PPTC device 100, where a PPTC body 104 is disposed between a first electrode 102 and a second electrode 106 that are arranged on a first side and a second side of the PPTC body 104, respectively. FIG. 1B illustrates a configuration of the PPTC device 100 after a first terminal 108 is joined to the first electrode 102 and a second terminal 110 is joined to the second electrode 106. The first terminal 108 may be joined to the first electrode 102 using any suitable, electrically conductive means of affixation (e.g., by soldering, welding, conductive epoxy, etc.) to form a first interface 112, and the second terminal 110 may be similarly joined to second electrode 106 to form a second interface 114.

According to embodiments of the present disclosure, the PPTC body 104 may be formed from of a PPTC material having a relatively low percolation threshold as further detailed below. The first electrode 102 and the second electrode 106 may be formed of various metals, including, but not limited to, copper foil. In some embodiments, the copper foil may be nickel plated. The first terminal 108 and the second terminal 110 may also be formed of various materials, including, but not limited to, copper or brass. The embodiments are not limited in this context.

In some embodiments of the present disclosure, the PPTC body 104 may be formed of a composite PPTC material that includes a polymer matrix and a conductive filler. The polymer matrix may be, or may include, a semi-crystalline polymer such as a polyvinylidene fluoride (PVDF) polymer, an ethylene vinyl acetate (EVA) polymer, a high-density polyethylene (HDPE) polymer, an ethylene tetrafluoroethylene (ETFE) polymer, or a perfluoroalkoxy (PFA) polymer. The embodiments are not limited in this context.

According to some embodiments of the present disclosure, the conductive filler of the PPTC material may be formed of particles of an electrically conductive ceramic material, including, but not limited to, titanium carbide, tungsten carbide, vanadium carbide, zirconium carbide, niobium carbide tantalum carbide, molybdenum carbide, titanium boride, vanadium boride, zirconium boride, niobium boride, molybdenum boride, hafnium boride, or mixtures thereof.

The percolation threshold of the PPTC material may be in a range of about 20% to about 39%. That is, the volume fraction of conductive filler in the PPTC material may range from about 20% to about 39%. Those of ordinary skill in the art will recognize that a percolation threshold in the stated range is lower than the percolation thresholds of conventional PPTC materials, which generally have percolation thresholds above 40%. The relatively low percolation thresholds of the present disclosure are achieved by using relatively small particles of conductive filler in the PPTC material. For example, in various embodiments, the median diameter of the particles of conductive filler in the PPTC material may be in a range of about 50 nanometers to 20 micrometers. It has been found that using conductive particles of such relatively small size can achieve a given resistivity in a PPTC material using a smaller quantity of conductive filler by volume relative to particles of larger size that are traditionally used in conventional PPTC materials. The cost and weight of the PPTC material of the present disclosure may therefore be lower than those of traditional PPTC devices while achieving similar operational characteristics such as resistivity and trip temperature.

Figure 2A:
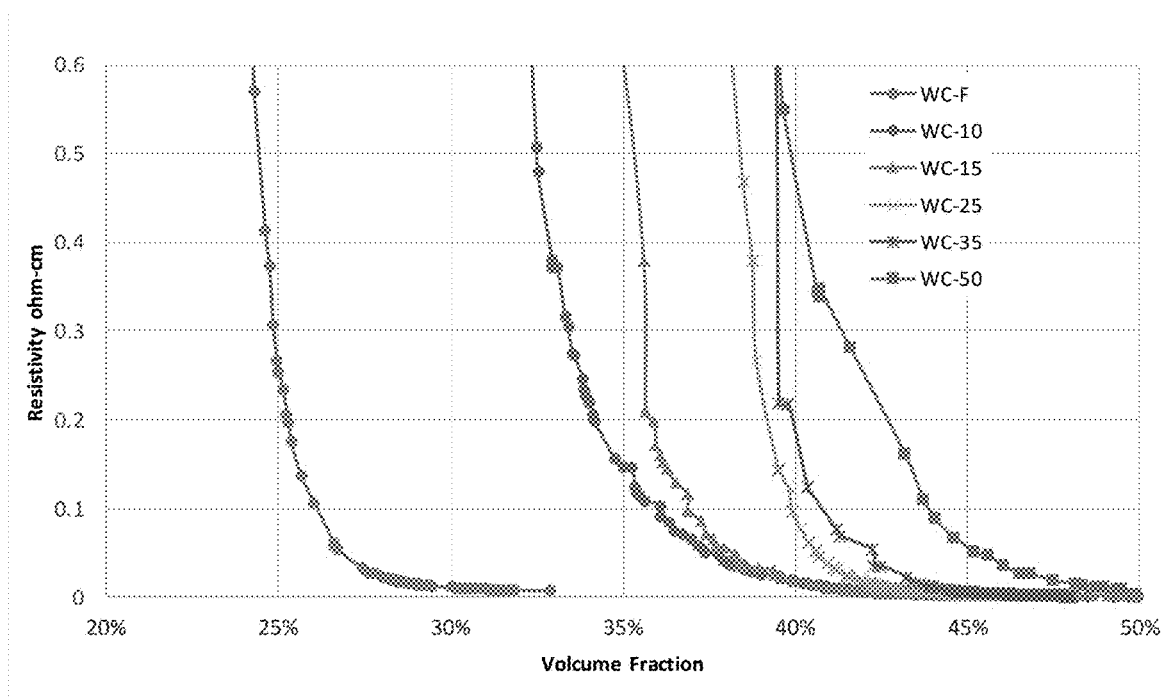
FIG. 2A and FIG. 2B illustrate the effect of varying the size of conductive particles in PPTC materials on the resistivity and percolation threshold of such materials.
Figure 2B:
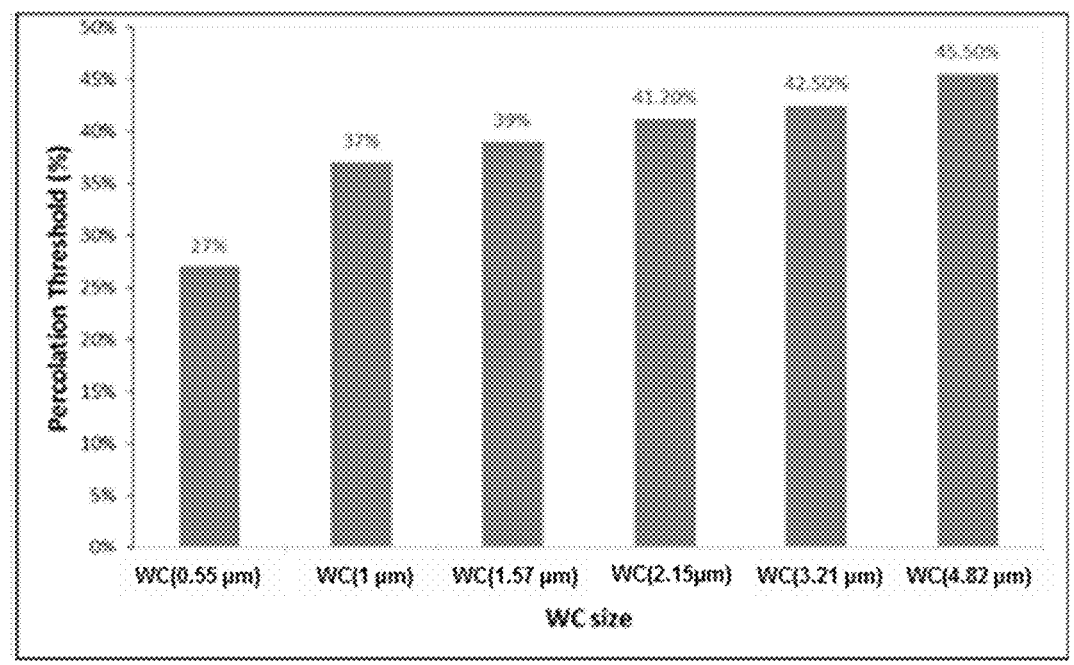

Turning now to FIG. 2A, there is shown a graph plotting the resistivities of PPTC materials in accordance with the present disclosure as a function of volume fractions of conductive filler (tungsten carbide in this example) of different particle sizes in such materials. As can be seen, a PPTC material having a volume fraction of about 27% of conductive particles with a median diameter of 0.55 micrometers may have a resistivity of about 0.15 ohm-cm, and a PPTC material having a volume fraction of about 41.2% of conductive particles with a median diameter of 2.15 micrometers may also have a resistivity of about 0.15 ohm-cm. FIG. 2B shows a bar graph illustrating percolation thresholds of various sizes of conductive filler particles (tungsten carbide in this example) necessary for achieving PPTC materials with the same resistivity. For example, a PPTC material having conductive particles with a medium diameter of 1 micrometer will have a percolation threshold of about 37% to achieve the same resistivity as a PPTC material having conductive particles with a medium diameter of 1.57 micrometers at a percolation threshold of about 39%. Thus, it can be seen that different PPTC materials that include different volume fractions of conductive filler can be made to have similar resistivities by varying the sizes of conductive particles in such materials.

Figure 3:
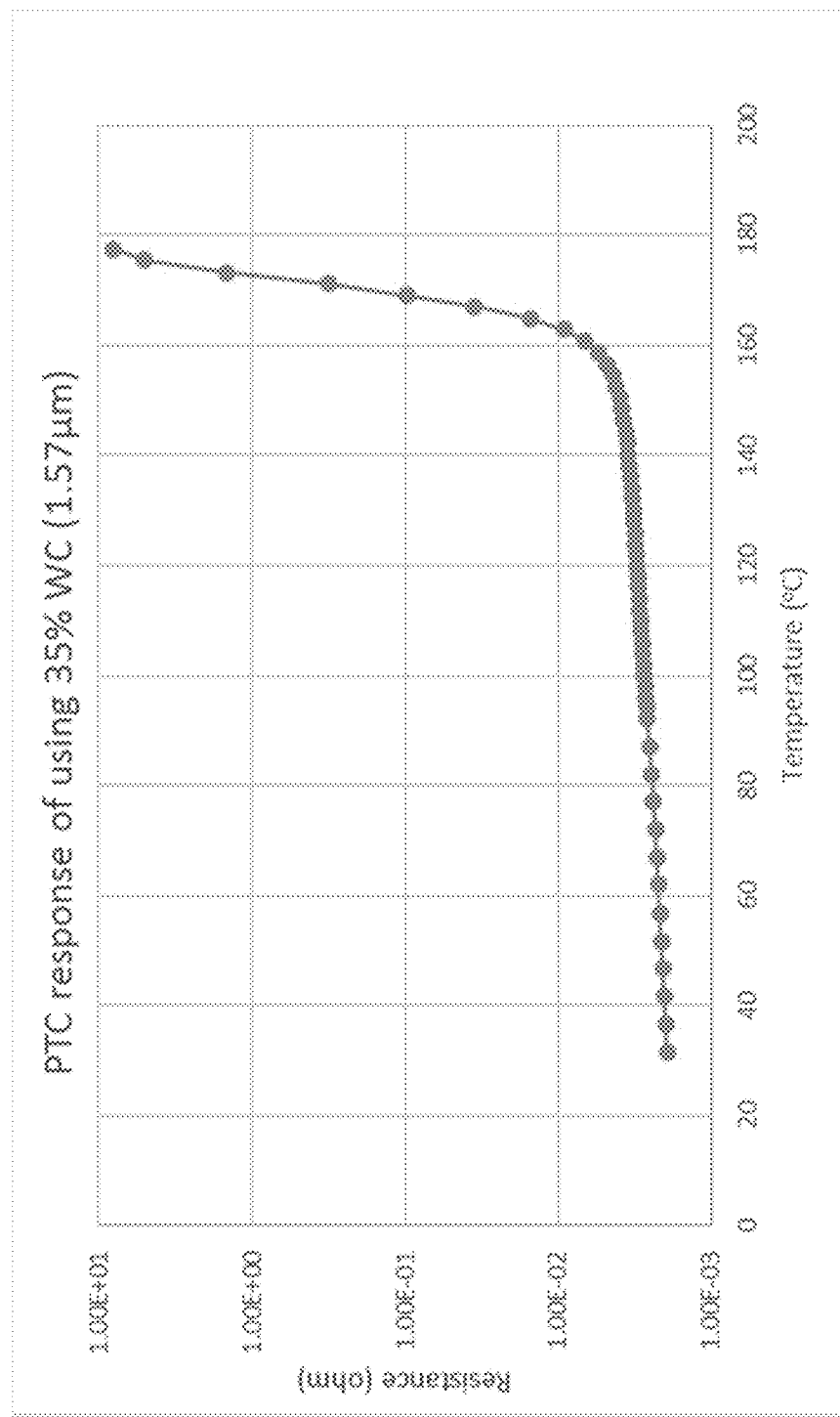
FIG. 3 illustrates exemplary resistance behavior for a PPTC material according to embodiments of the present disclosure.

Turning now to FIG. 3 there is shown a graph plotting the resistance behavior as a function of temperature of a PPTC device, arranged according to embodiments of the disclosure. In this example, the PPTC material of the PPTC device has a percolation threshold of 35% of conductive filler (tungsten carbide in this example) with particles having a median diameter of 1.57 micrometers. As shown, an abrupt increase in resistance takes place at 160-165° C. Accordingly, the PPTC material of FIG. 3 may be deemed to exhibit a trip temperature of about 163° C.

The hold current density of the PPTC materials of the present disclosure may be designed to exhibit a value between 0.05 to 0.4 A/mm$^2$ by appropriate choice of volume fraction of conductive filler and type of conductive filler, where hold current density is calculated as a ratio of the hold current of a PPTC material at 25° C. to the area of the PPTC through which current travels between opposing electrodes.

Figure 4:
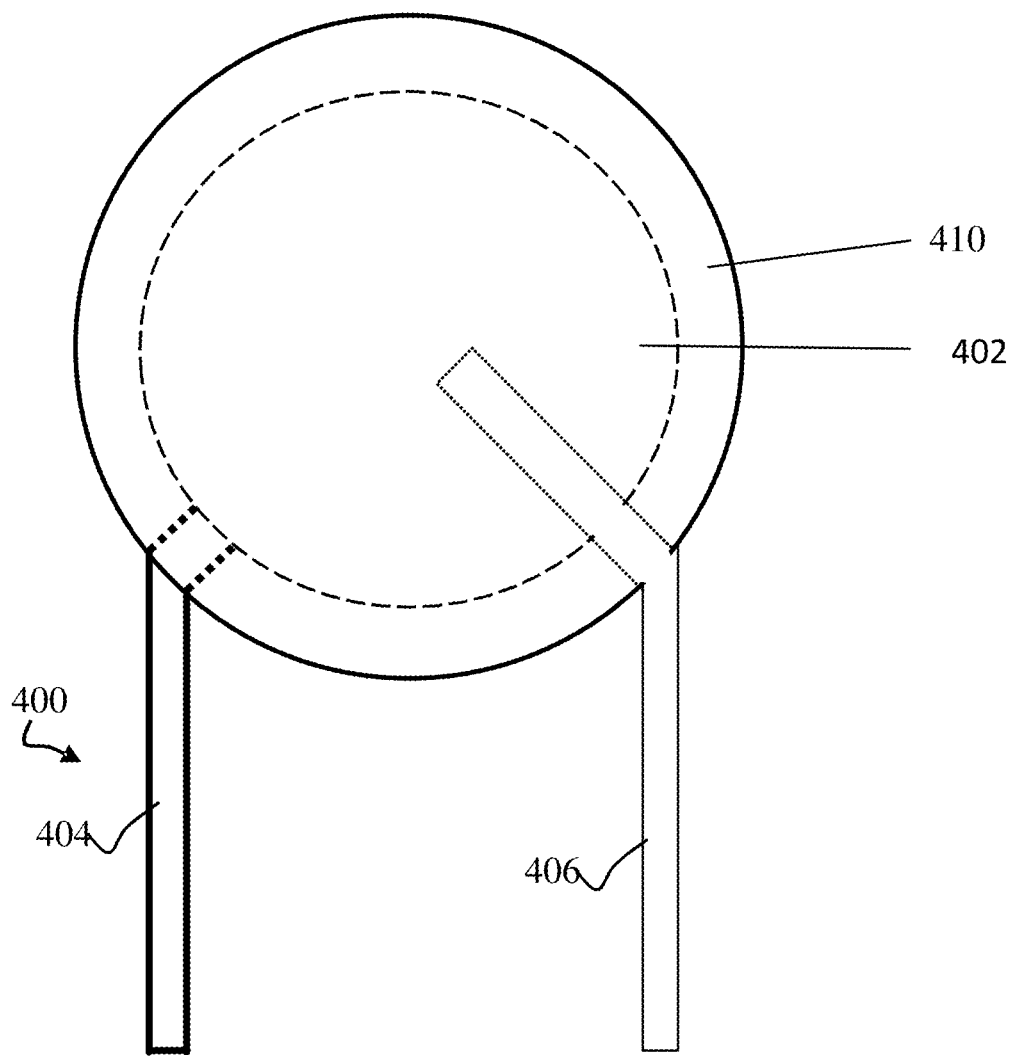
FIG. 4 illustrates a PPTC device according to an embodiment of the present disclosure.

The configuration of a PPTC device may vary according to different embodiments of the present disclosure. FIG. 4 presents a top plan view of a PPTC device 400, shown as a radial lead PPTC device, including a bottom lead 404 and a top lead 406, attached to opposite surfaces of a PPTC body 402. The PPTC body 402 may have first and second electrodes (not separately shown) attached to the top surface and bottom surface thereof, respectively, as generally described above. The PPTC device 400 may be encapsulated by an encapsulant layer 410, such as an epoxy. The PPTC body 402 may be formed of a PPTC material formulated generally as described above, having low percolations thresholds, such as in a range of 20%-39%.

Figure 5A:
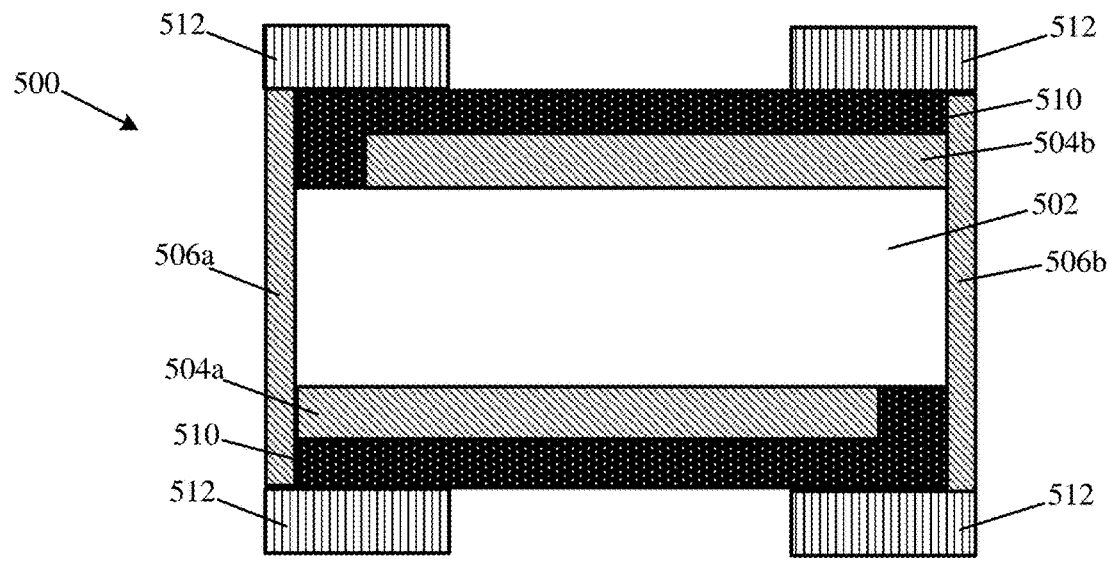
FIGS. 5A and 5B illustrate PPTC devices according to various additional embodiments of the present disclosure.
Figure 5B:
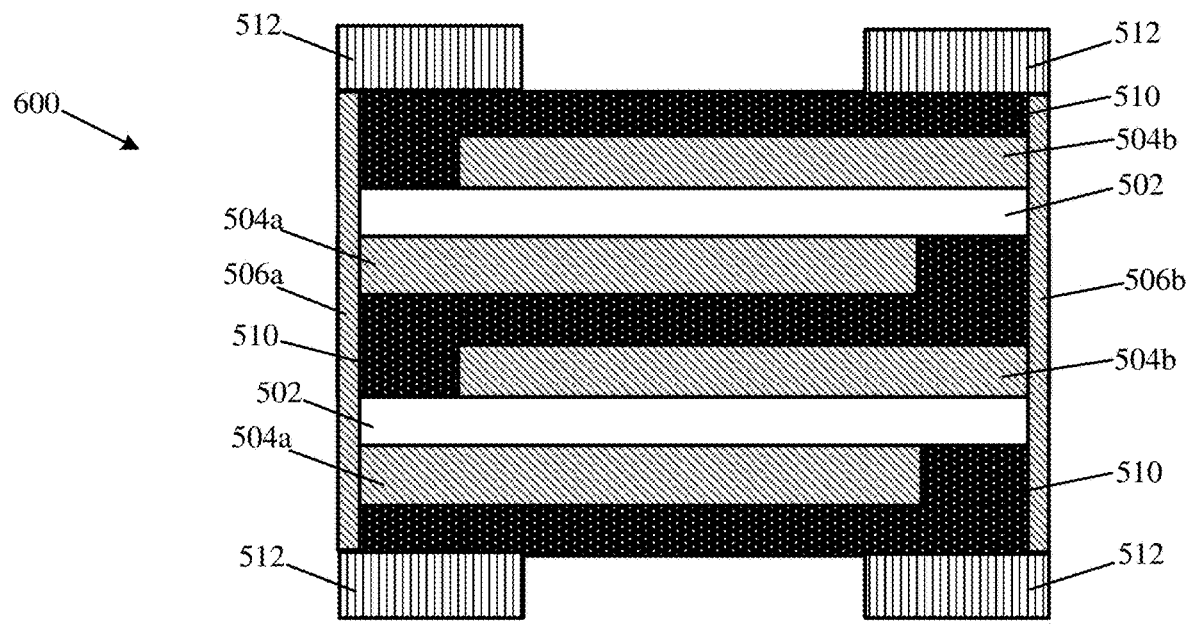

FIG. 5A and FIG. 5B depict side cross-sectional views of embodiments of a single-layer surface mount PPTC device 500 and a double-layer surface mount PPTC device 600, respectively, according to exemplary embodiments of the present disclosure. These devices may include PPTC bodies 502, and first and second metallic foil layers 504a, 504b disposed on opposing sides of the PPTC bodies 502 and extending longitudinally from first and second metallic traces 506a, 506b at opposing longitudinal ends of the PPTC bodies 502, wherein the first metallic foil layers 504 extend toward, but does not contact, the second metallic traces 506b, and wherein the second metallic foil layers 504b extend toward, but does not contact, the first metallic traces 506a. The devices may further include electrically insulating insulation layers 510 covering the metallic foil layers 504a, 504b, and metallic electrodes 512 disposed on the outermost insulation layers 510 in electrical contact with the metallic traces 506a, 506b. In these devices, the PPTC bodies 502 may be formed of a PPTC material formulated generally as described above, having a low percolation threshold, such as in a range of 20%-39%.

While the present embodiments have been disclosed with reference to certain embodiments, numerous modifications, alterations and changes to the described embodiments are possible while not departing from the sphere and scope of the present disclosure, as defined in the appended claims. Accordingly, the present embodiments are not to be limited to the described embodiments and may have the full scope defined by the language of the following claims, and equivalents thereof.

What is claimed is:

1. A polymeric positive temperature coefficient (PPTC) device, comprising:
   a PPTC body;
   a first electrode disposed on a first side of the PPTC body; and
   a second electrode disposed on a second side of the PPTC body;
   wherein the PPTC body is formed of a PPTC material that includes a polymer matrix and a conductive filler comprising tungsten carbide, the conductive filler further comprising a volume fraction parameter and a median diameter of conductive particles parameter such that PPTC material exhibits a resistivity of approximately 0.15 ohm-cm; wherein the volume fraction parameter and median diameter of conductive particles parameter are selected from a group consisting of:
   27% volume fraction of conductive particles with a median diameter of 0.55 µm;
   37% volume fraction of conductive particles with a median diameter of 1.0 µm;
   39% volume fraction of conductive particles with a median diameter of 1.57 µm;
   41.2% volume fraction of conductive particles with a median diameter of 2.15 µm;
   42.5% volume fraction of conductive particles with a median diameter of 3.21 µm; and
   45.5% volume fraction of conductive particles with a median diameter of 4.82 µm.

2. The PPTC device of claim 1, wherein the PPTC material exhibits a hold current density of between 0.05 to 0.4 A/mm$^2$.

3. The PPTC device of claim 1, wherein the polymer matrix includes at least one of a polyvinylidene fluoride (PVDF) polymer, an ethylene vinyl acetate (EVA) polymer, a high-density polyethylene (HDPE) polymer, an ethylene tetrafluoroethylene (ETFE) polymer, and a perfluoroalkoxy (PFA).

4. The PPTC device of claim 1, wherein at least one of the first electrode and the second electrode is formed of copper foil.

5. The PPTC device of claim 4, wherein the copper foil is plated with nickel.

6. A polymeric positive temperature coefficient (PPTC) material comprising:
   a polymer matrix; and
   a conductive filler comprising tungsten carbide, the conductive filler further comprising a volume fraction parameter and a median diameter of conductive particles parameter such that PPTC material exhibits a resistivity of approximately 0.15 ohm-cm; wherein the volume fraction parameter and median diameter of conductive particles parameter are selected from a group consisting of:
   27% volume fraction of conductive particles with a median diameter of 0.55 µm;
   37% volume fraction of conductive particles with a median diameter of 1.0 µm;
   39% volume fraction of conductive particles with a median diameter of 1.57 µm;
   41.2% volume fraction of conductive particles with a median diameter of 2.15 µm;
   42.5% volume fraction of conductive particles with a median diameter of 3.21 µm; and
   45.5% volume fraction of conductive particles with a median diameter of 4.82 µm.

7. The PPTC material of claim 6, wherein the PPTC material exhibits a hold current density of between 0.05 to 0.4 A/mm$^2$.

8. The PPTC material of claim 6, wherein the polymer matrix includes at least one of a polyvinylidene fluoride (PVDF) polymer, an ethylene vinyl acetate (EVA) polymer, a high-density polyethylene (HDPE) polymer, an ethylene tetrafluoroethylene (ETFE) polymer, and a perfluoroalkoxy (PFA).

* * * * *